United States Patent
Ting et al.

(10) Patent No.: US 8,110,967 B2
(45) Date of Patent: Feb. 7, 2012

(54) SPHERICAL ROTARY PIEZOELECTRIC MOTOR

(75) Inventors: Yung Ting, Tao Yuan County (TW); Yi-Ta Lee, Tao Yuan County (TW)

(73) Assignee: Chung-Yuan Christian University, Tao Yuan County (TW)

( * ) Notice: Subject to any disclaimer, the term of this patent is extended or adjusted under 35 U.S.C. 154(b) by 352 days.

(21) Appl. No.: 12/453,259

(22) Filed: May 5, 2009

(65) Prior Publication Data

US 2010/0207488 A1    Aug. 19, 2010

(30) Foreign Application Priority Data

Feb. 13, 2009 (TW) ................................ 98104576 A

(51) Int. Cl.
*H01L 41/08* (2006.01)
(52) U.S. Cl. .................... 310/371; 310/323.01
(58) Field of Classification Search .................. 310/323, 310/371
See application file for complete search history.

(56) References Cited

U.S. PATENT DOCUMENTS

| | | | | | |
|---|---|---|---|---|---|
| 1,919,796 | A | * | 7/1933 | Marrison | 310/350 |
| 3,202,736 | A | * | 8/1965 | Horan et al. | 264/619 |
| 4,983,875 | A | * | 1/1991 | Masaki et al. | 310/323.03 |
| 5,410,232 | A | * | 4/1995 | Lee | 318/568.11 |
| 5,872,417 | A | * | 2/1999 | Sugaya | 310/323.17 |
| 6,254,708 | B1 | * | 7/2001 | Cappabianca | 156/89.12 |
| 6,384,515 | B1 | * | 5/2002 | Ganor et al. | 310/328 |
| 6,734,914 | B1 | * | 5/2004 | Nishimura et al. | 348/375 |
| 7,459,834 | B2 | * | 12/2008 | Knowles et al. | 310/328 |
| 7,804,224 | B2 | * | 9/2010 | Takahashi et al. | 310/323.02 |
| 2008/0238249 | A1 | * | 10/2008 | Takahashi et al. | 310/317 |
| 2010/0084944 | A1 | * | 4/2010 | Suzuki | 310/323.02 |
| 2010/0320869 | A1 | * | 12/2010 | Li et al. | 310/323.02 |

FOREIGN PATENT DOCUMENTS

CN       201435691 Y  *  3/2010

OTHER PUBLICATIONS

Ting et al., Yung, Stator Design of a 2DOF Traveling-Wave Rotary Piezoelectric Motor, 2008 IEEE International Conference on Robotics and Biomimetrics (ROBIO), Feb. 21, 2009, Thailand.

* cited by examiner

*Primary Examiner* — Jaydi San Martin
(74) *Attorney, Agent, or Firm* — Bacon & Thomas, PLLC

(57) ABSTRACT

A spherical rotary piezoelectric motor comprises a spherical rotor, a hemispherical stator, and a plurality of piezoelectric actuators. The hemispherical stator comprises an inner surface and an outer surface, wherein the inner surface forms a hemispherical hollow portion which substantially corresponds to the spherical rotor so as to contain a portion of the spherical rotor. The plurality of piezoelectric actuators is arranged on the inner surface (or the outer surface) of the hemispherical stator respectively so as to drive the hemispherical stator. The hemispherical stator generates traveling waves with a resultant elliptical motion, so the spherical rotor can be rotated accordingly with at least one degree of freedom.

13 Claims, 13 Drawing Sheets

SPHERICAL ROTARY PIEZOELECTRIC MOTOR

BACKGROUND OF THE INVENTION

1. Field of the Invention

The present invention relates to a spherical rotary piezoelectric motor, and more particularly, to a multi degrees of freedom rotary traveling wave piezoelectric motor.

2. Description of the Related Art

Generally, piezoelectric motor has the advantages of small size, light weight, less noise, high thrust at low speed, high holding force, fast response, and no EMI problem, and so on. It has been widely used in many areas such as digital still camera, watch, automobile, robot, micro positioning system, medical device, aerospace, and micro machinery, etc.

In order to achieve multi degrees of freedom by using piezoelectric motors, a few implementations have been proposed, such as (1) using piezoelectric actuators to support and to drive a spherical rotor so as to control the motions of the spherical rotor, this type of piezoelectric motor is used as the device of Scanning Electron Microscope (SEM); (2) using multi disc-type piezoelectric actuators to drive a spherical rotor, since each piezoelectric actuator is driven with a different vibration mode, therefore, multi degrees of freedom is achieved by mixing different vibration modes (as stated in Taiwan patent No. I288523); and (3) using three sets of ring-shaped piezoelectric actuators implemented with equal spatial distance to drive a spherical rotor to achieve three degrees of freedom, this type of piezoelectric motor is used in multi-axis mechanical manipulators or CCD surveillance cameras.

Although the present piezoelectric motors provide various advantages and functions, the implementations of the above-described piezoelectric motors are still complicated; therefore, it is necessary to provide a simple rotary piezoelectric motor design which can achieve multi degrees of freedom.

SUMMARY OF THE INVENTION

It is an objective of the present invention to provide a multi degrees of freedom spherical rotary piezoelectric motor.

It is another objective of the present invention to provide a spherical rotary piezoelectric motor comprising a hemispherical stator to achieve rotations with multi degrees of freedom.

In order to achieve above objectives, the present invention provides a spherical rotary piezoelectric motor, which comprises a spherical rotor, a hemispherical stator, and a plurality of piezoelectric actuators. The hemispherical stator comprises an inner surface and an outer surface, wherein the inner surface forms a hemispherical hollow portion, and the hemispherical hollow portion substantially corresponds to the spherical rotor such that the hemispherical hollow portion receives a portion of the spherical rotor (such as one half of the spherical rotor so as to facilitate rotation). A plurality of piezoelectric actuators is disposed on the outer surface of the hemispherical stator respectively. The plurality of piezoelectric actuators drives the hemispherical stator to generate a traveling wave with an elliptical motion, and the spherical rotor can rotate with at least one degree of freedom caused by the traveling wave with the elliptical motion.

The plurality of piezoelectric actuators is arranged at least in a line along the outer surface of the hemispherical stator such that the spherical rotor can rotate with at least one degree of freedom. To achieve two degrees of freedom, the piezoelectric actuators are arranged in an orthogonal cross shape on the outer surface of the hemispherical stator. Furthermore, when the piezoelectric actuators are additionally arranged in a circle along a hemispherical opening of the hemispherical stator, the spherical rotor can rotate with three degrees of freedom. Therefore, the present invention can achieve various multiple degrees of freedom through various arrangements of the piezoelectric actuators on the surface of the hemispherical stator.

In order to match the curve of the outer surface of the hemispherical stator, in a preferred embodiment of the present invention, each piezoelectric actuator comprises a curved surface complying with the outer surface of the hemispherical stator. Preferably, a radius of the curved surface is substantially 18.75 mm.

In this embodiment, the hemispherical stator is made of aluminum with a thickness of substantially 2 mm. A diameter of the inner surface and a diameter of the outer surface of the hemispherical stator are substantially 58 mm and 60 mm respectively.

The spherical rotary piezoelectric motor in the present invention further comprises a base and a retaining ring, and the base includes a container portion corresponding to the hemispherical stator, wherein the retaining ring and the base are fixed by a plurality of elastic fixing members so as to have the spherical rotor, the hemispherical stator and the plurality of piezoelectric actuators disposed between the retaining ring and the base. In operations, the plurality of piezoelectric actuators drives the hemispherical stator to generate a traveling wave with an elliptical motion. Since the spherical rotor and the hemispherical stator are fixed between the retaining ring and the base, the traveling wave with the elliptical motion from the hemispherical stator can generate rotations with at least one degree of freedom.

In the embodiment described above, the plurality of piezoelectric actuators is arranged on the outer surface of the hemispherical stator, however, the present invention is not limited to the arrangement as described; in another embodiment of the present invention, the plurality of piezoelectric actuators is arranged on the inner surface of the hemispherical stator respectively.

Therefore, the present invention additionally provides a spherical rotary piezoelectric motor, which comprises a spherical rotor, a hemispherical stator and a plurality of piezoelectric actuators. What is different from the previous embodiment is that the plurality of piezoelectric actuators in this embodiment is arranged on the inner surface of the hemispherical stator respectively; that is, the plurality of piezoelectric actuators is disposed between the hemispherical stator and the spherical rotor. Similarly, the plurality of piezoelectric actuators can drive the hemispherical stator to generate a traveling wave with an elliptical motion, and the spherical rotor can rotate with at least one degree of freedom caused by the traveling wave with the elliptical motion.

In this embodiment, a thickness of the hemispherical stator is substantially 2 mm. A diameter of the inner surface and a diameter of the outer surface of the hemispherical stator are substantially 56 mm and 58 mm respectively.

In this embodiment, the plurality of piezoelectric actuators is disposed between the hemispherical stator and the spherical rotor. Preferably, the spherical rotary piezoelectric motor further comprises a contact layer, the contact layer substantially complies with the plurality of piezoelectric actuators along a line, and the contact layer is disposed between the plurality of piezoelectric actuators and the spherical rotor so as to amplify the traveling wave with the elliptical motion generated by the hemispherical stator and to precisely control the rotation of the spherical rotor. Preferably, one side of the contact layer contacting the spherical rotor is formed with gear teeth. For better conducting effect, the contact layer can be made of aluminum.

DETAILED DESCRIPTION OF THE PREFERRED EMBODIMENT

The advantages and innovative features of the invention will become more apparent from the following detailed description when taken in conjunction with the accompanying drawings.

Figure 1:
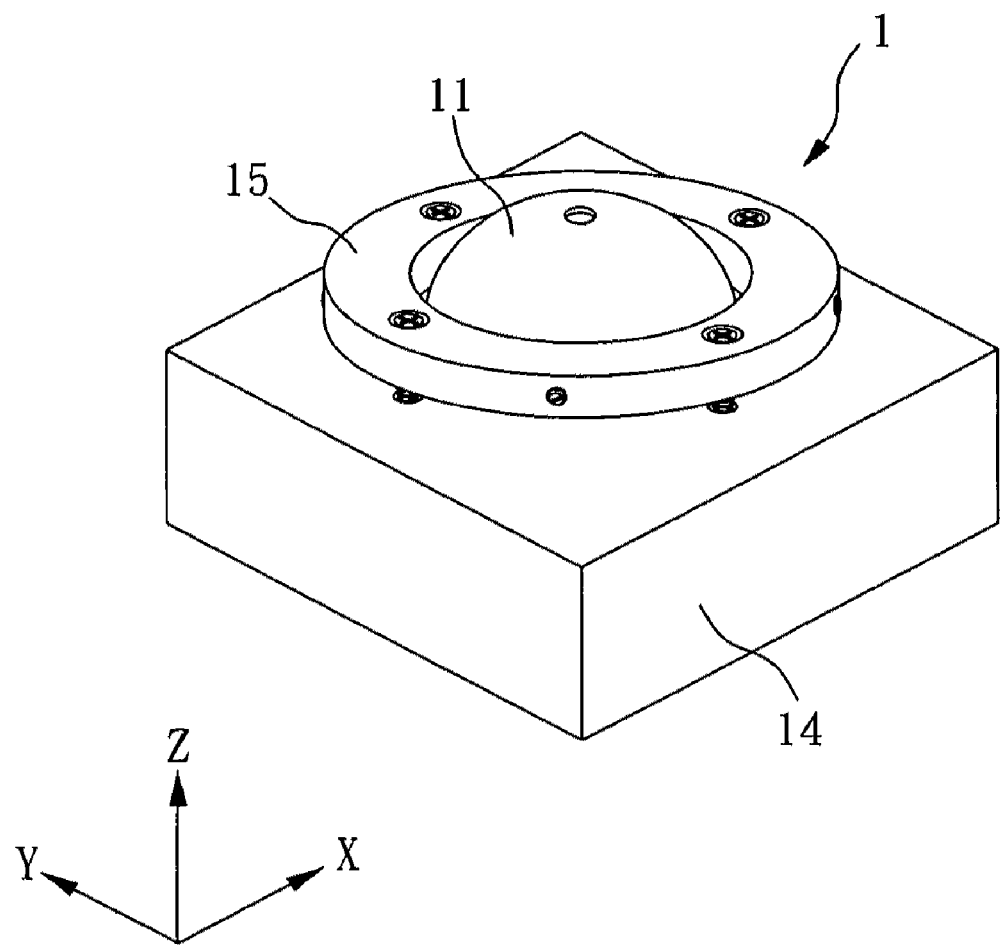
FIG. 1 illustrates a 3D view of a spherical rotary piezoelectric motor in the present invention.
Figure 2:
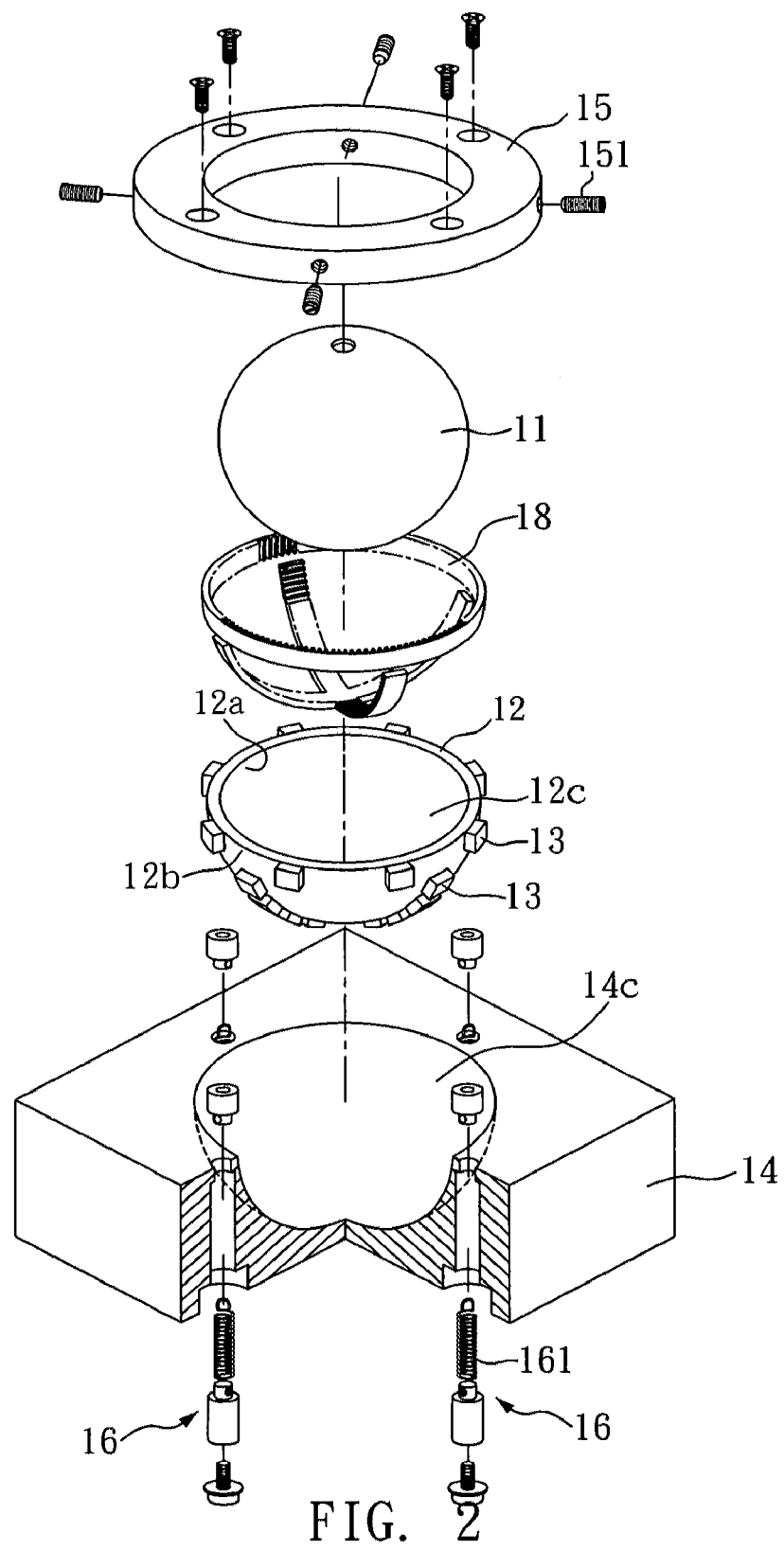
FIG. 2 illustrates a 3D explosive view in accordance with the spherical rotary piezoelectric motor shown in FIG. 1.

Please refer to the 3D view of FIG. 1 and the explosive view of FIG. 2 at the same time. The present invention provides a spherical rotary piezoelectric motor 1, which comprises a spherical rotor 11, a hemispherical stator 12, and a plurality of piezoelectric actuators 13.

The hemispherical stator 12 comprises an inner surface 12a and an outer surface 12b, the inner surface 12a forms a hemispherical hollow portion 12c, and the hemispherical hollow portion 12c substantially corresponds to the spherical rotor 11 for allowing the hemispherical hollow portion 12c to contain a portion of the spherical rotor 11 (such as one half of the spherical rotor 11 to facilitate rotation).

A plurality of piezoelectric actuators 13, which can be piezoelectric ceramic actuators, is disposed on the outer surface 12b of the hemispherical stator 12 respectively. The plurality of piezoelectric actuators 13 drives the hemispherical stator 12 to generate a traveling wave with an elliptical motion (which is described below), and the spherical rotor 11 can rotate with at least one degree of freedom caused by the traveling wave with the elliptical motion being generated by the hemispherical stator 12.

Furthermore, the plurality of piezoelectric actuators 13 is arranged at least in a line along the outer surface 12b of the hemispherical stator 12, so the spherical rotor 11 can rotate with at least one degree of freedom (such as rotating along the x or y axis in FIG. 1). To achieve two degrees of freedom, the plurality of piezoelectric actuators 13 is arranged in an orthogonal cross shape on the outer surface 12b of the hemispherical stator 12. Besides, as shown in FIG. 2, when the piezoelectric actuators 13 is additionally arranged in a circle along a hemispherical opening of the hemispherical stator 12, the spherical rotor 11 can rotate with three degrees of freedom (such as rotating along the x, y or z axis in FIG. 1). Therefore, the present invention can achieve various multiple degrees of freedom through various arrangements of the piezoelectric actuators 13 on the surface of the hemispherical stator 12.

To provide better conducting effect, the spherical rotor 11 and/or the hemispherical stator 12 are made of aluminum or aluminum alloy or other suitable materials. Besides, in order to amplify the traveling wave with the elliptical motion generated by the hemispherical stator 12 and to precisely control the rotation of the spherical rotor 11, the spherical rotary piezoelectric motor 1 further comprises a contact layer 18, as shown in FIG. 2, wherein the contact layer substantially complies with the inner surface 12a of the hemispherical stator 12 and corresponds to the arrangement of the plurality of piezoelectric actuators 13. Preferably, one side of the contact layer 18 contacting the spherical rotor 11 is formed with gear teeth (as shown in FIG. 8). The contact layer 18 can be made of aluminum to provide better conducting effect.

In this embodiment, the spherical rotary piezoelectric motor 1 further comprises a base 14 and a retaining ring 15. The base 14 includes a container portion 14c corresponding to the hemispherical stator 12, and the retaining ring 15 and the base 14 are fixed by a plurality of elastic fixing members 16 so as to have the spherical rotor 11, the hemispherical stator 12, and the plurality of piezoelectric actuators 13 disposed between the retaining ring 15 and the base 14. Since the spherical rotary piezoelectric motor 1 basically operates with the rotation of the spherical rotor 11, even though the spherical rotor 11 and the hemispherical stator 12 are fixed between the retaining ring 15 and the base 14, it is necessary for the hemispherical stator 12 to be elastic to generate the traveling wave with the elliptical motion; therefore, the elastic fixing member 16 is designed to comprise a spring 161 or the like.

Figure 3:
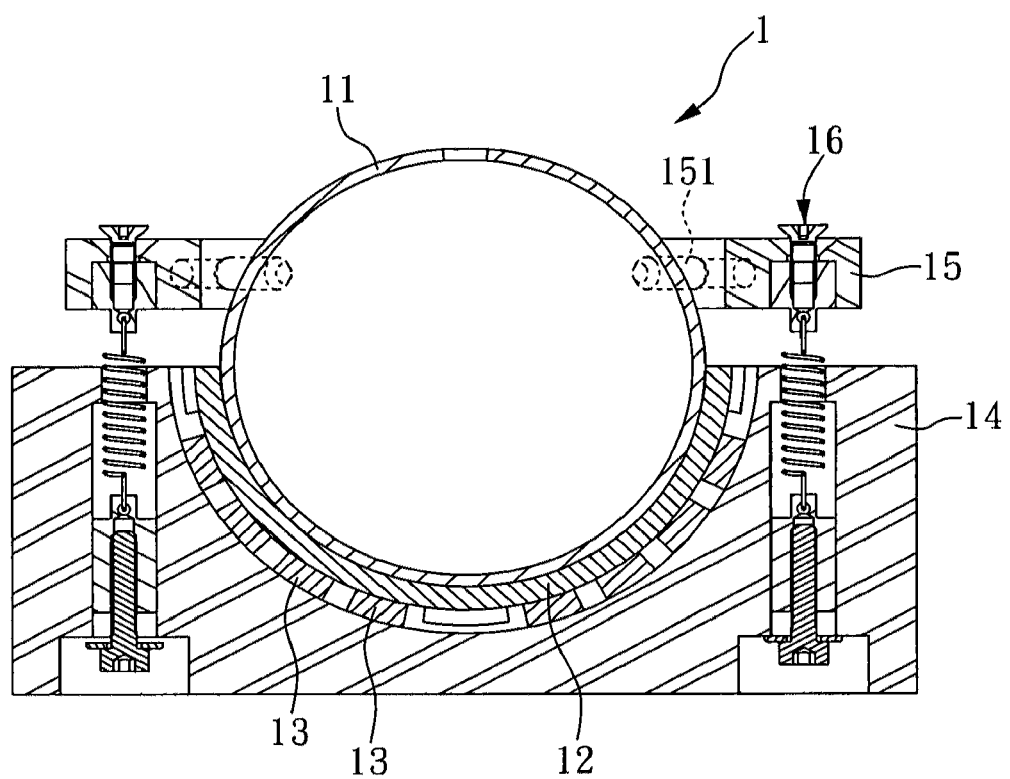
FIG. 3 illustrates a sectional view in accordance with the spherical rotary piezoelectric motor shown in FIG. 1.
Figure 4:
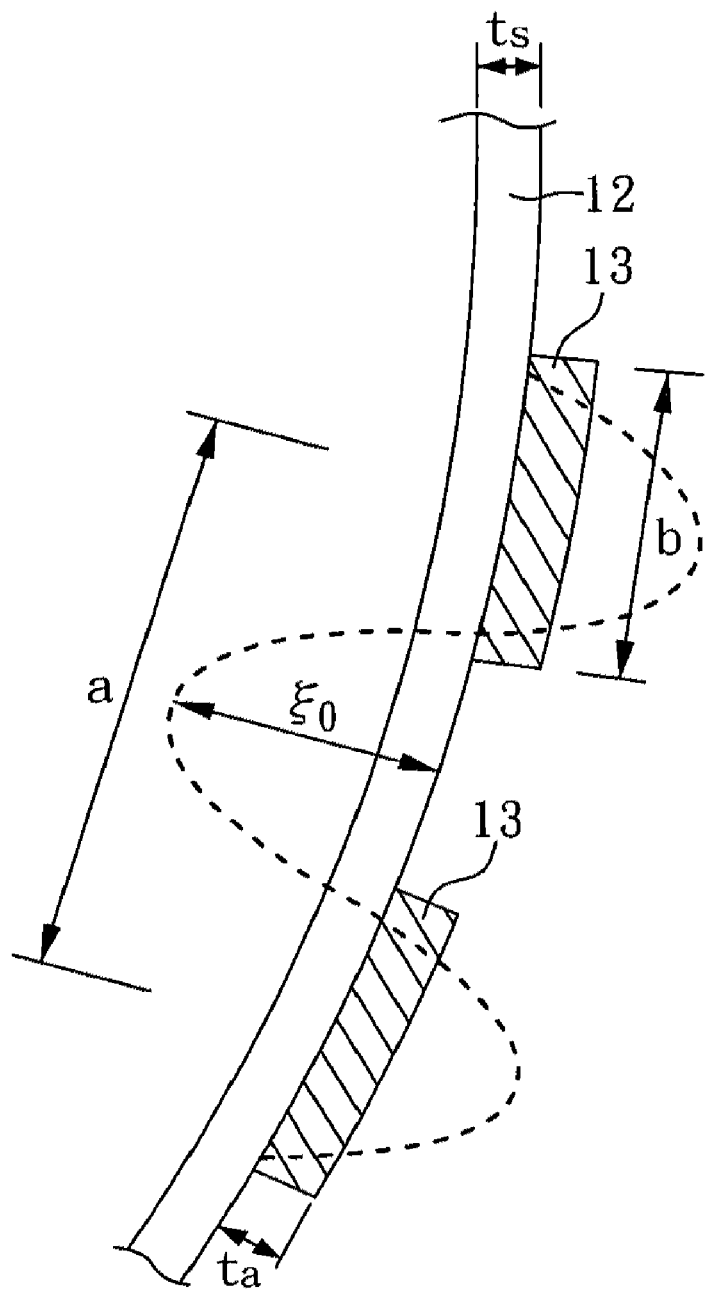
FIG. 4 illustrates a partially sectional view when the plurality of piezoelectric actuators is arranged on the outer surface of the hemispherical stator.

Please also refer to the sectional view shown in FIG. 3. In this embodiment, the elastic fixing member 16 comprises the spring 161 and a plurality of screws (not illustrated with reference number), the plurality of screws is locked to the retaining ring 15 and the base 14 respectively for allowing the spring 161 to be disposed between two screws so as to let the hemispherical stator 12 be elastic when generating the traveling wave.

In order to match the curve of the outer surface 12b of the hemispherical stator 12, in a preferred embodiment of the present invention, each piezoelectric actuator 13 comprises a curved surface complying with the outer surface 12b of the hemispherical stator 12. Preferably, a radius of the curved surface is substantially 18.75 mm. In this embodiment, the hemispherical stator 12 comprises a thickness of substantially 2 mm. A diameter of the inner surface 12a and a diameter of the outer surface 12b of the hemispherical stator 12 are substantially 58 mm and 60 mm respectively. In practice, the size of the piezoelectric actuator 13 is calculated by using the resonant frequency, when the resonant frequency ω is found, the wavelength λ is calculated by $w_c/\omega$, where $w_c$ is the sound wave conductivity coefficient.

According to the above embodiment, an example of the hemispherical stator design specifications of a resolution 1.6 rad (calculated by linear resolution of 0.1 mm and diameter of 60 mm), an angular speed of 15 deg/sec, and a maximum rotation angle of 180° is investigated as below, wherein $t_s$ is the thickness of the hemispherical stator 12, $t_a$ is the thickness of the piezoelectric actuator 13, b is the width of the piezoelectric actuator 13, and a is the distance between the neighboring piezoelectric actuators 13. When two voltages having 90° phase difference with each other are applied on the neighboring piezoelectric actuators 13, the waveform of the odd and even sets of piezoelectric actuators 13 are described respectively as equation (1) and equation (2):

$$\xi_A \sin(\omega t - kx) + \xi_A \sin(\omega t - kx) \quad (1)$$

$$\xi_B \sin\{\omega t - (kx+a) + \phi\} + \xi_B \sin\{\omega t + (kx+a) + \phi\} \quad (2)$$

where n is odd number and m is even number; k is the wave number and $k=\omega/v$; $v$ is the wave velocity and $\lambda$ is the wave length; $\xi_A$ and $\xi_B$ are the vibration amplitude of odd and even set of piezoelectric actuators respectively; a is the distance between neighboring piezoelectric actuators 13 and equal to $\lambda(n-m)$; $\phi$ is phase difference between odd and even number of piezoelectric actuators 13 and equal to $\pi(n+m)/2$.

By using superposition, with the same applied voltage amplitude, i.e, $\xi_A = \xi_B = \xi_o$, the above equations (1) and (2) can be combined into equation (3), which is given by:

$$2\xi_o \sin(\omega t - kx) \quad (3)$$

Any particle of the traveling wave follows the elliptical motion, which in turn can drive the spherical rotor 11 to rotate. By using the above equation (3), various assignments of parameters m and n can obtain corresponding a and $\phi$. In consideration of small structural size, $a=\lambda/4$ and $\phi=\pi/2$ are used. Therefore, it is derived that the spherical rotary piezoelectric motor 1 comprises design specifications of the resolution 1.6 rad, the angular speed of 15 deg/sec, and the maximum rotation angle of 180°.

In the elliptical motion, the vertical displacement w of the neutral plane is given by the equation (4):

$$w = \xi_o \sin(\omega t - kx) \quad (4)$$

where $\xi_o$ is a vibrating amplitude produced on the hemispherical stator 12; $\omega$ is the frequency (Hz); t is time; and $k(=2\pi/\lambda)$ is the wave number.

The horizontal displacement determines the resolution; similarly, it is given by the equation (5):

$$u = (\pi \xi_o t_s / \lambda) \cos(\omega t - kx) \quad (5)$$

By differentiating (5), velocity is given by equation (6):

$$\dot{u} = (-\pi \xi_o t_s \omega / \lambda) \sin(\omega t - kx) \quad (6)$$

From the above equations (5) and (6), the wave length $\lambda$, amplitude $\xi_o$, and the thickness $t_s$ of the hemispherical stator 12 are design factors; therefore, the maximum horizontal displacement can be determined to be $\pi \xi_o t_s / \lambda$ on equation (5). Besides, in equation (6), resonant frequency $\omega$ is another important factor, which dominates the velocity output.

Figure 5:
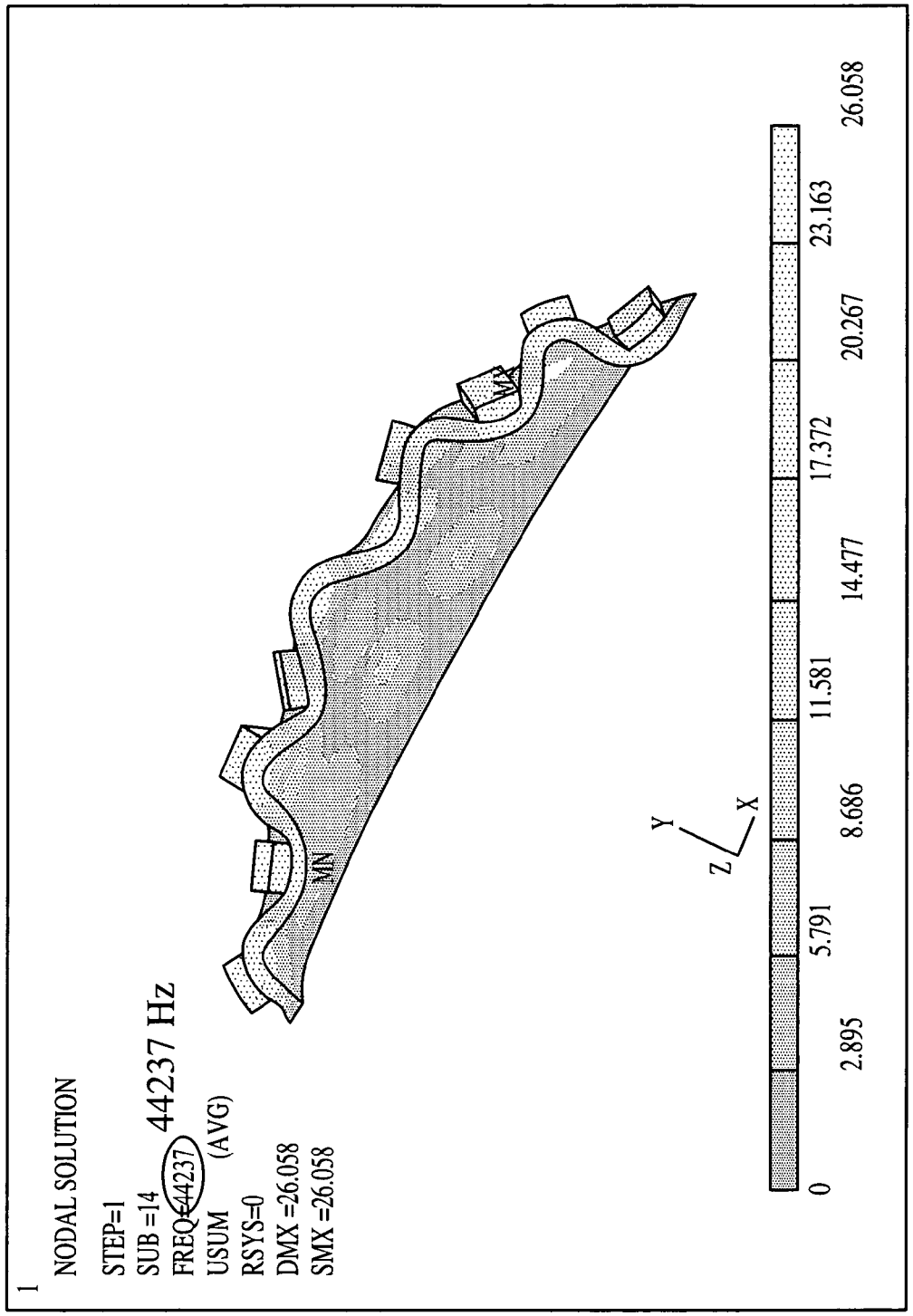
FIG. 5 illustrates a traveling wave simulation diagram of the hemispherical stator when the resonant frequency is about 44,237 Hz.
Figure 6A:
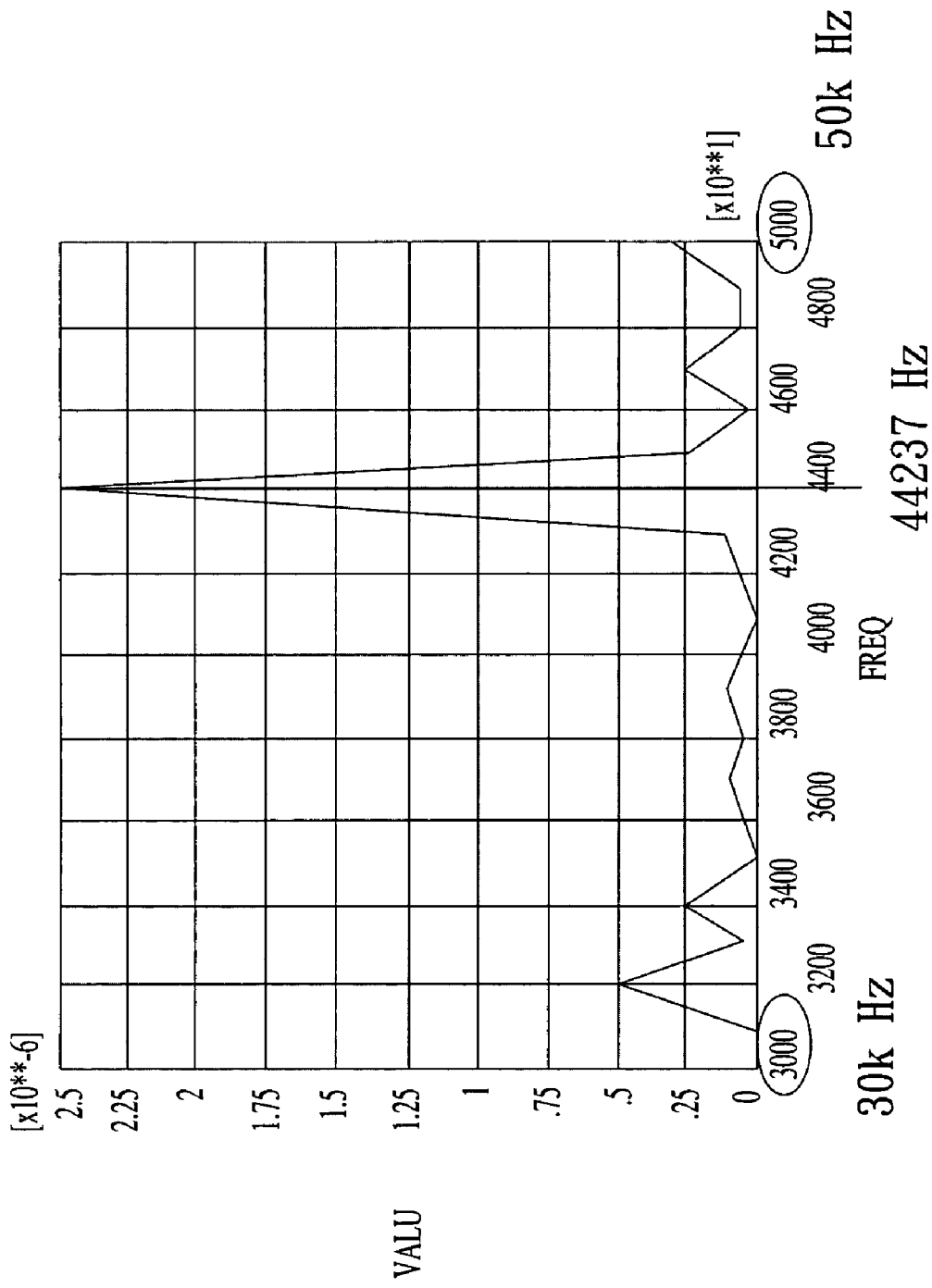
FIG. 6A and FIG. 6B illustrate displacements of the elliptical motion in the x and y direction respectively.
Figure 6B:
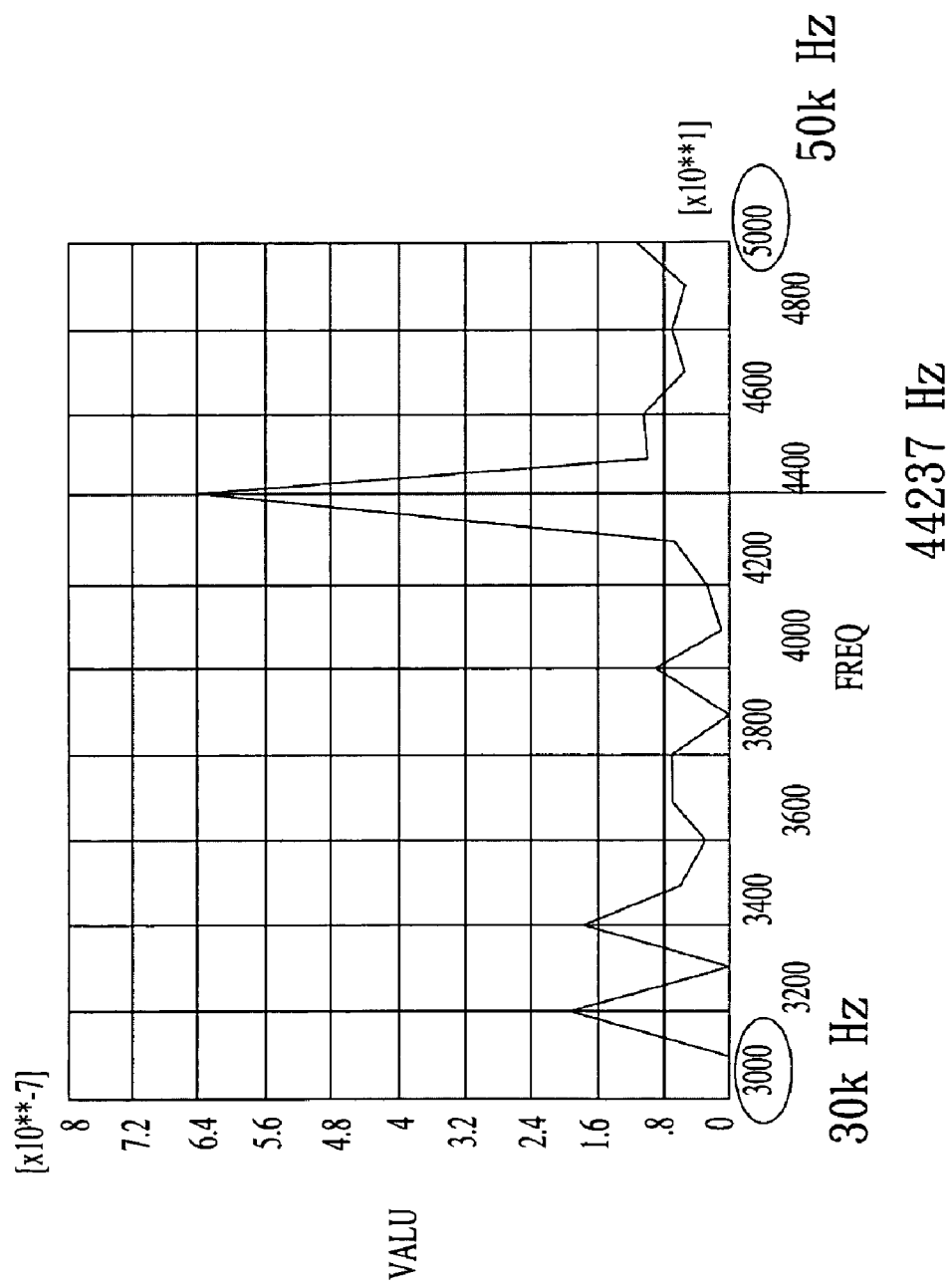

FIG. 5 illustrates a traveling wave simulation diagram of the hemispherical stator 12 when the resonant frequency is about 44,237 Hz. FIG. 6A and FIG. 6B illustrate displacements of the elliptical motion in the x and y direction respectively.

In the embodiment described above, the plurality of piezoelectric actuators 13 is arranged on the outer surface 12b of the hemispherical stator 12, however, the present invention is not limited to the arrangement as shown in Figures. In another embodiment of the present invention, the piezoelectric actuators 13 are arranged on the inner surface 12a of the hemispherical stator 12.

Figure 7:
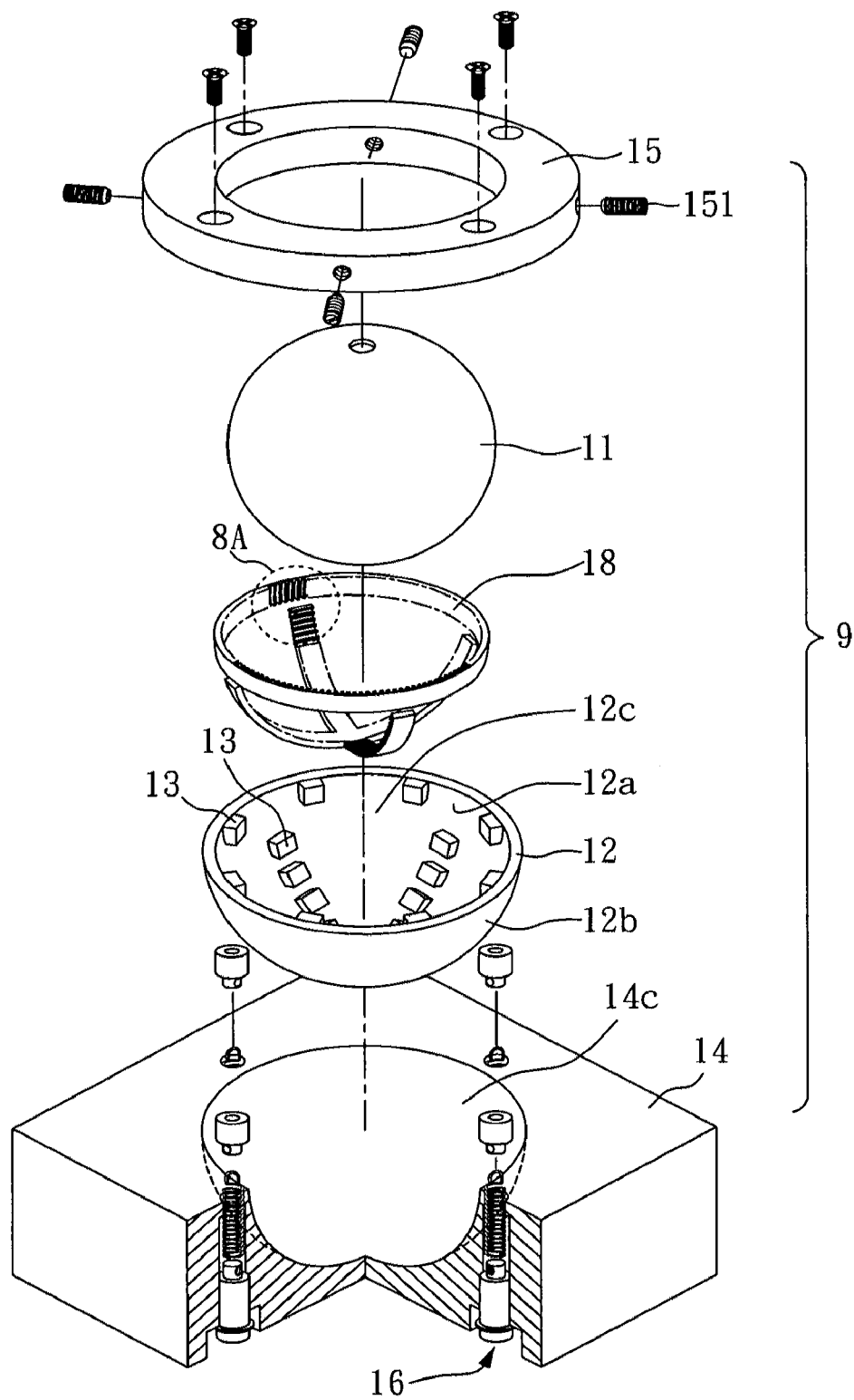
FIG. 7 illustrates a 3D explosive view of a spherical rotary piezoelectric motor in another embodiment in the present invention.

Therefore, please refer to FIG. 7, the present invention additionally provides a spherical rotary piezoelectric motor 9, which comprises a spherical rotor 11, a hemispherical stator 12 and a plurality of piezoelectric actuators 13. What is different from the previous embodiment, the plurality of piezoelectric actuators 13 in this embodiment is arranged on the inner surface 12a of the hemispherical stator 12, that is, the plurality of piezoelectric actuators 13 is disposed between the hemispherical stator 12 and the spherical rotor 11.

Figure 8A:
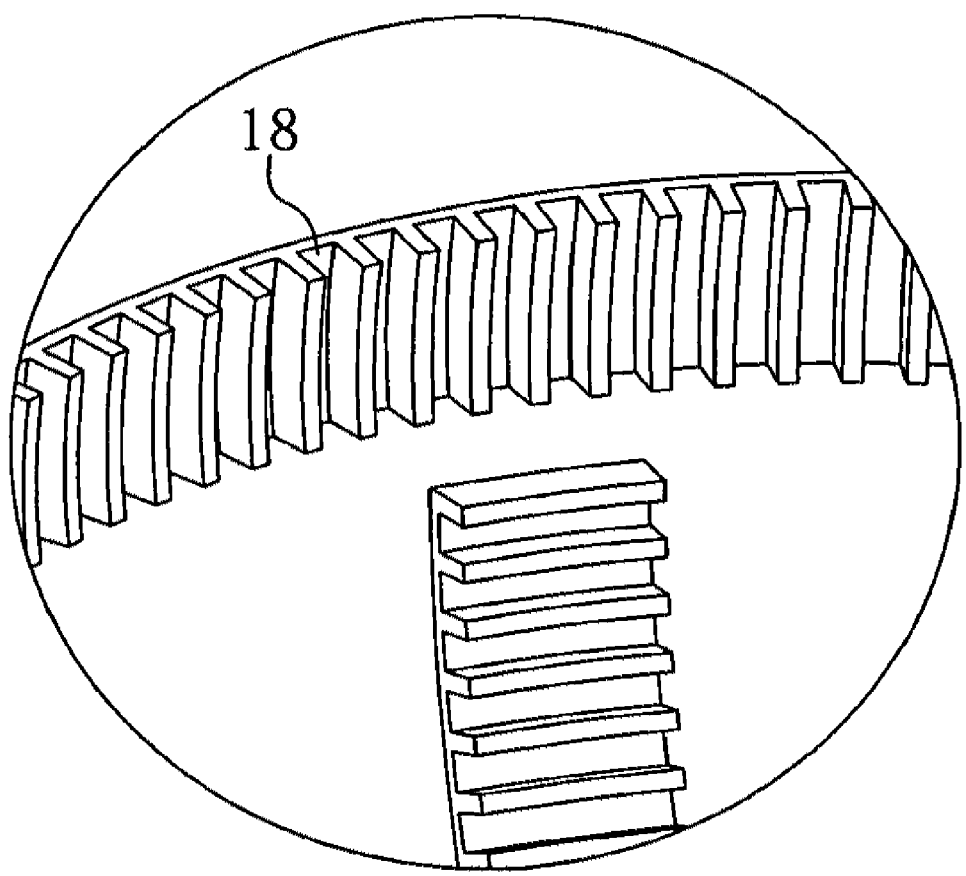
FIG. 8A illustrates a partial view of a contact layer.

Preferably, in this embodiment, the spherical rotary piezoelectric motor 9 further comprises a contact layer 18. The contact layer 18 substantially complies with and corresponds to the plurality of piezoelectric actuators 13, as shown in the embodiment in FIG. 2. The piezoelectric actuators 13 can be arranged at least in a line for the spherical rotor 11 to rotate with at least one degree of freedom (such as rotating along the x or y axis). To achieve two degrees of freedom, a plurality of piezoelectric actuators 13 is arranged additionally in an orthogonal cross shape. Besides, when the piezoelectric actuators 13 are additionally arranged in a circle along a hemispherical opening of the hemispherical stator 12, the spherical rotor 11 can rotate with three degrees of freedom (such as rotating along the x, y or z axis). Therefore, the contact layer 18 is substantially disposed according to the arrangement of the piezoelectric actuators 13. The contact layer 18 is disposed between the piezoelectric actuators 13 and the spherical rotor 11 to amplify the traveling wave with the elliptical motion generated by the hemispherical stator 12 and to precisely control the rotation of the spherical rotor 11. Preferably, as shown in FIG. 8A, one side of the contact layer 18 contacting the spherical rotor 11 is formed with gear teeth. The contact layer 18 can be made of aluminum to provide better conducting effect.

Figure 9:
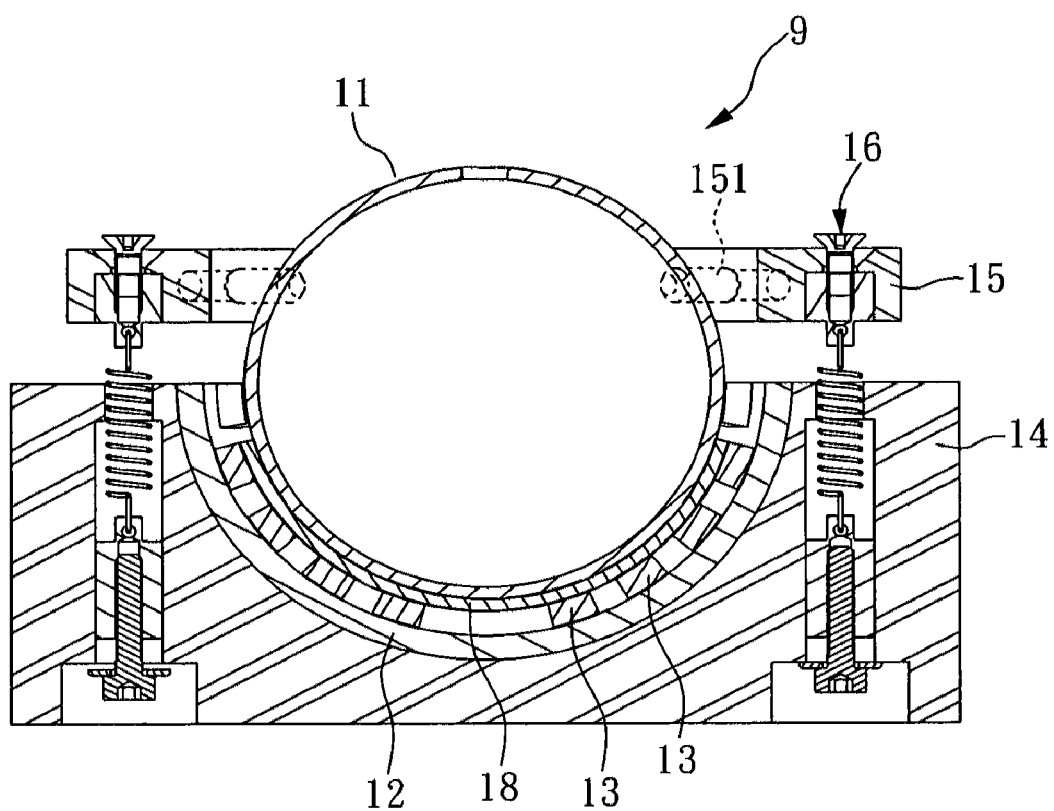
FIG. 9 illustrates a 3D explosive view in accordance with the spherical rotary piezoelectric motor shown in FIG. 7.

Please refer to FIG. 9, the piezoelectric actuators 13 drives the hemispherical stator 12 to generate a traveling wave with an elliptical motion, and the traveling wave with the elliptical motion generated by the hemispherical stator 12 can allow the spherical rotor 11 to rotate with at least one degree of freedom. In this embodiment, it is also possible to use the elastic fixing member 16 for the hemispherical stator 12 to generate the traveling wave with more flexibility. It will not be further described for the sake of brevity as being described above.

In this embodiment, the thickness of the hemispherical stator is still 2 mm. The diameter of the inner surface and the diameter of the outer surface of the hemispherical stator are substantially 56 mm and 58 mm respectively.

Figure 10:
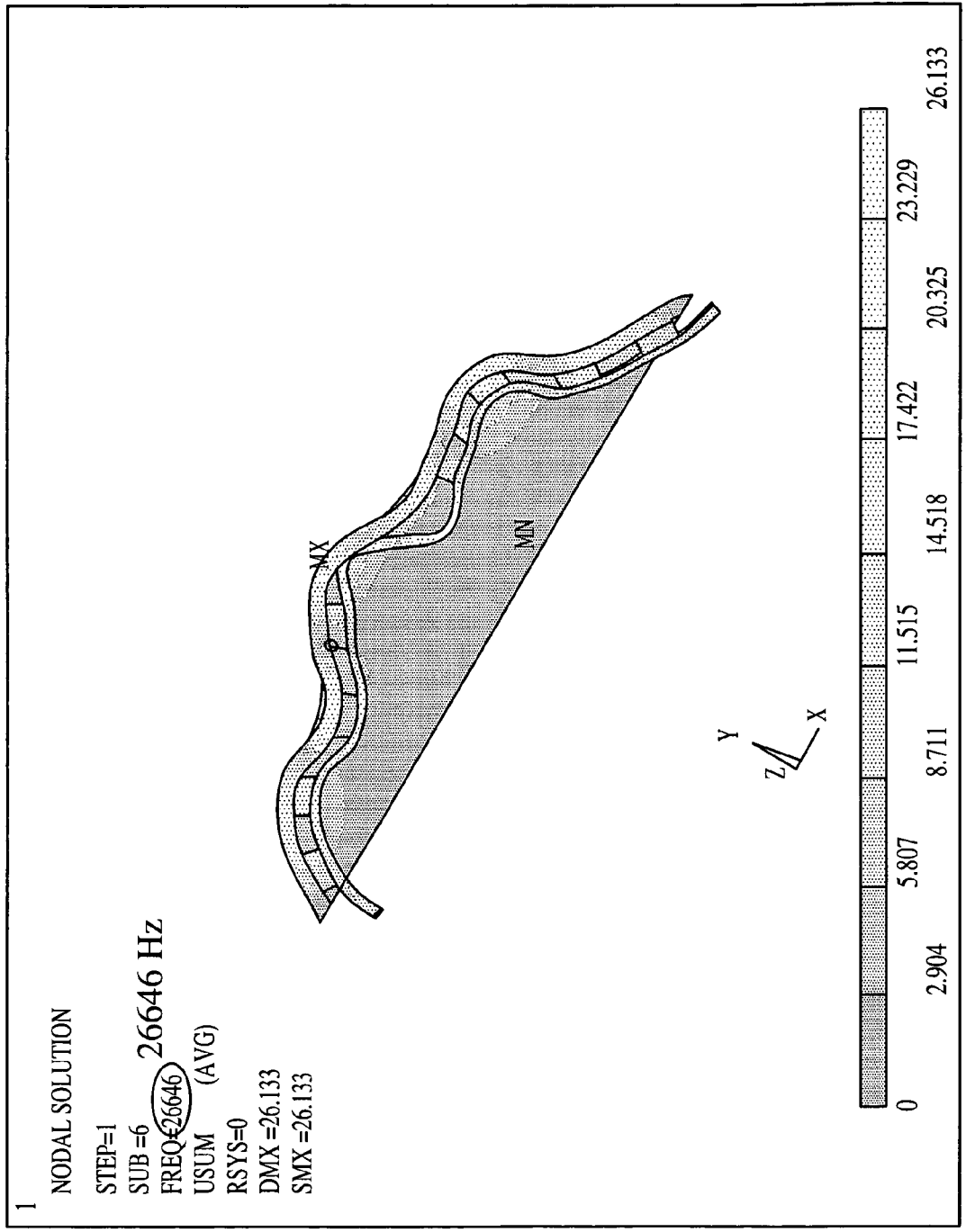
FIG. 10 illustrates a traveling wave simulation diagram of the hemispherical stator when the resonant frequency is about 26,646 Hz.
Figure 11A:
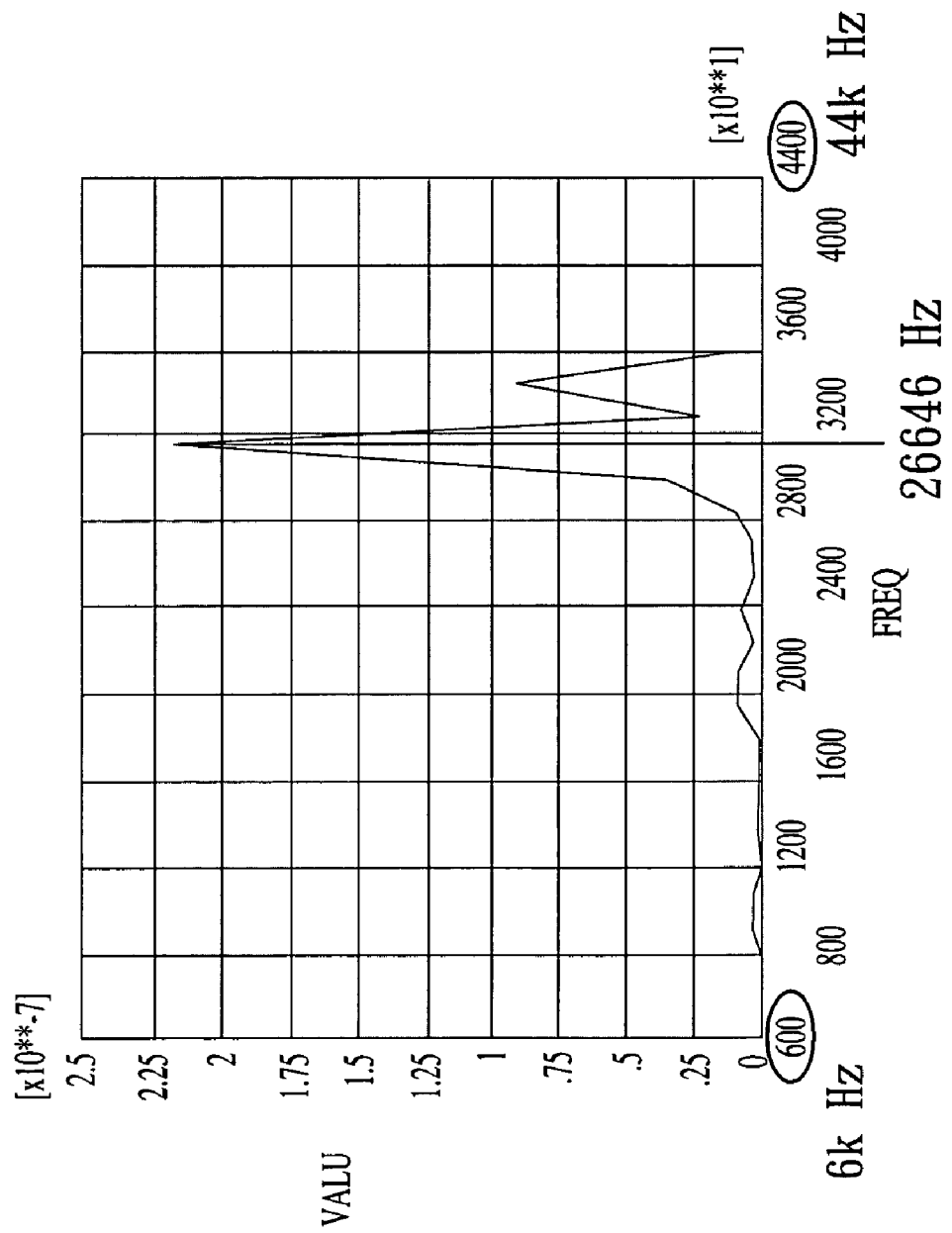
FIG. 11A and FIG. 11B illustrate displacements of the elliptical motion in the x and y direction respectively in accordance with FIG. 10.
Figure 11B:
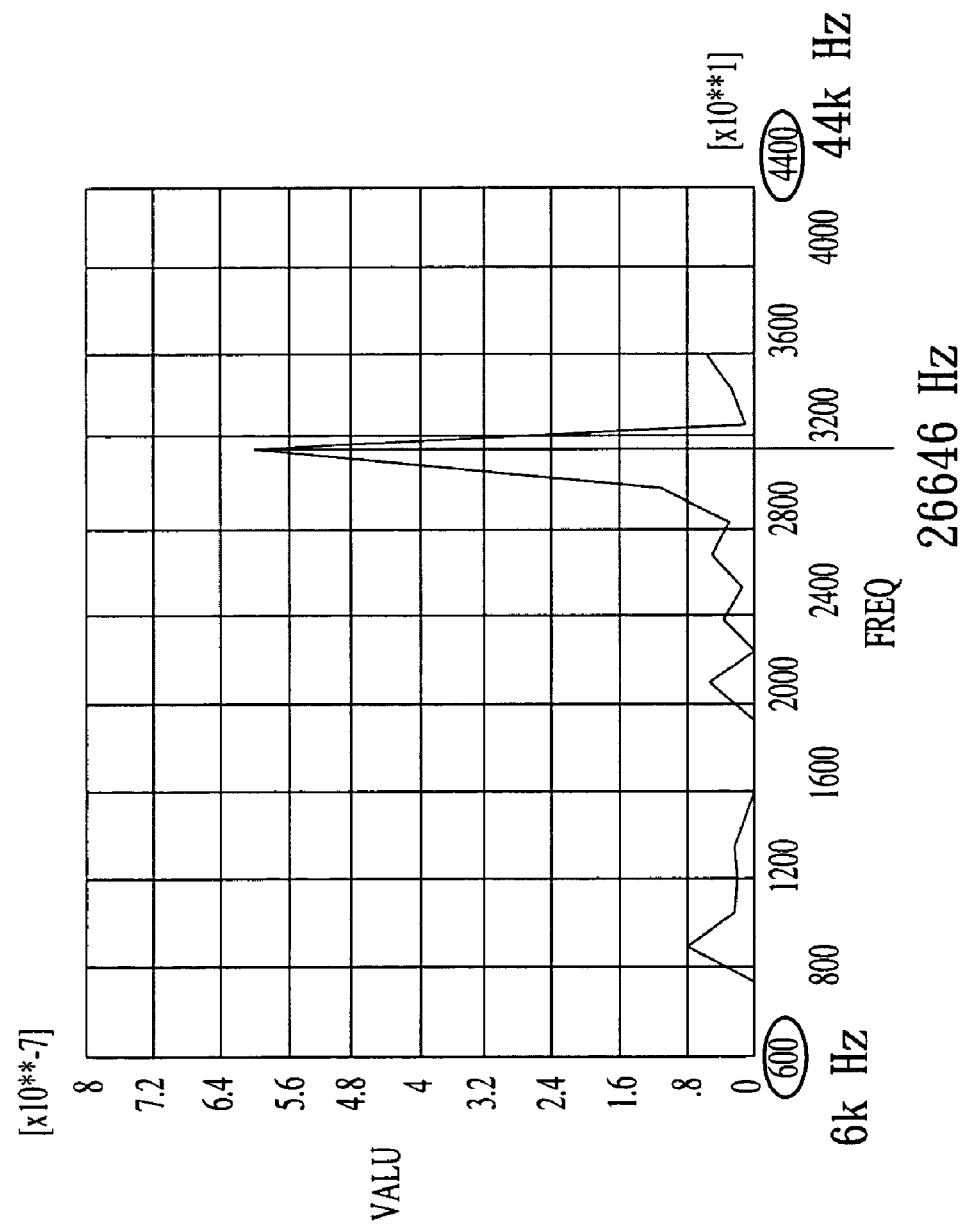

Please refer to FIG. 10, which illustrates a traveling wave simulation diagram of the hemispherical stator when the resonant frequency is about 26,646 Hz. FIG. 11A and FIG. 11B illustrate displacements of the elliptical motion in the x and y direction respectively.

It is noted that the above-mentioned embodiments are only for illustration, it is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A spherical rotary piezoelectric motor comprising:
   a spherical rotor;
   a hemispherical stator, the hemispherical stator comprising an inner surface and an outer surface, the inner surface forming a hemispherical hollow portion, the hemispherical hollow portion substantially corresponding to the spherical rotor for the hemispherical hollow portion to receive a portion of the spherical rotor; and
   a plurality of piezoelectric actuators being disposed on the outer surface of the hemispherical stator respectively;
   wherein the plurality of piezoelectric actuators drives the hemispherical stator to generate a traveling wave with an elliptical motion, and the spherical rotor can rotate with at least one degree of freedom caused by the traveling wave with the elliptical motion.

2. The spherical rotary piezoelectric motor as claimed in claim 1, wherein the plurality of piezoelectric actuators is arranged at least in a line along the outer surface of the hemispherical stator.

3. The spherical rotary piezoelectric motor as claimed in claim 2, wherein the plurality of piezoelectric actuators is arranged in an orthogonal cross shape on the outer surface of the hemispherical stator and in a circle along a hemispherical opening of the hemispherical stator so as to rotate the spherical rotor with three degrees of freedom.

4. The spherical rotary piezoelectric motor as claimed in claim 1, wherein each piezoelectric actuator comprises a curved surface complying with the outer surface of the hemispherical stator.

5. The spherical rotary piezoelectric motor as claimed in claim 4, wherein a radius of the curved surface of each piezoelectric actuator is substantially 18.75 mm.

6. The spherical rotary piezoelectric motor as claimed in claim 1, wherein a thickness of the hemispherical stator is substantially 2 mm, a diameter of the inner surface and a diameter of the outer surface of the hemispherical stator are substantially 58 mm and 60 mm respectively, and the hemispherical stator is made of aluminum or aluminum alloy.

7. The spherical rotary piezoelectric motor as claimed in claim 1 further comprising a base and a retaining ring, the base including a container portion corresponding to the hemispherical stator, wherein the retaining ring and the base are fixed by a plurality of elastic fixing members so as to have the spherical rotor, the hemispherical stator, and the plurality of piezoelectric actuators disposed between the retaining ring and the base.

8. A spherical rotary piezoelectric motor comprising:
a spherical rotor;
a hemispherical stator, the hemispherical stator comprising an inner surface and an outer surface, the inner surface forming a hemispherical hollow portion, the hemispherical hollow portion substantially corresponding to the spherical rotor so as to receive a portion of the spherical rotor, wherein a thickness of the hemispherical stator is substantially 2 mm;
a plurality of piezoelectric actuators being arranged on the inner surface of the hemispherical stator and between the hemispherical stator and the spherical rotor, the plurality of piezoelectric actuators being arranged at least in a line along the inner surface of the hemispherical stator; and
a contact layer, the contact layer substantially complying with the plurality of piezoelectric actuators along the line, the contact layer being disposed between the plurality of piezoelectric actuators and the spherical rotor so as to amplify the traveling wave with the elliptical motion generated by the hemispherical stator;
wherein the plurality of piezoelectric actuators drives the hemispherical stator to generate a traveling wave with an elliptical motion, and the spherical rotor can rotate with at least one degree of freedom caused by the traveling wave with the elliptical motion.

9. The spherical rotary piezoelectric motor as claimed in claim 8, wherein the plurality of piezoelectric actuators is arranged in an orthogonal cross shape on the inner surface of the hemispherical stator and in a circle along a hemispherical opening of the hemispherical stator so as to rotate the spherical rotor with three degrees of freedom.

10. The spherical rotary piezoelectric motor as claimed in claim 8, wherein each piezoelectric actuator comprises a curved surface complying with the inner surface of the hemispherical stator.

11. The spherical rotary piezoelectric motor as claimed in claim 8, wherein a diameter of the inner surface and a diameter of the outer surface of the hemispherical stator are substantially 56 mm and 58 mm respectively, and the hemispherical stator is made of aluminum or aluminum alloy.

12. The spherical rotary piezoelectric motor as claimed in claim 8, wherein a side of the contact layer contacting the spherical rotor is formed with gear teeth.

13. The spherical rotary piezoelectric motor as claimed in claim 8 further comprising a base and a retaining ring, the base including a container portion corresponding to the hemispherical stator, wherein the retaining ring and the base are fixed by a plurality of elastic fixing members so as to have the spherical rotor, the hemispherical stator and the plurality of piezoelectric actuators disposed between the retaining ring and the base.

* * * * *